Patented Dec. 14, 1937

2,101,887

UNITED STATES PATENT OFFICE 2,101,887

PRODUCTION OF EFFECTS ON MATERIALS

John Allan and James Arthur Wainwright, Spondon, near Derby, England, assignors to Celanese Corporation of America, a corporation of Delaware No Drawing. Application October 5, 1935, Serial No. 43,780. In Great Britain October 17, 1934

5 Claims. (Cl. 91—68)

This invention relates to the production of effects on materials and more particularly to the production of effects on textile materials, films, foils, plastics and the like made of or containing cellulose acetate or other cellulose ester or ether.

In producing effects on cellulose ester and ether materials with the aid of pigments, powdered metals and the like, difficulty is often experienced in obtaining bright effects which are fast to rubbing. Moreover many of the compositions which have been employed in the production of these effects tend to gelatinize and/or discolor on storage and have therefore to be employed while comparatively freshly prepared.

According to the present invention effects are produced on textile materials, films, foils, plastics and the like made of or containing cellulose esters or ethers by applying thereto a suspension of a comminuted effect material in a solution of a film-forming substance in a medium containing a substantial proportion of a volatile solvent for the cellulose ester or ether of the material treated, and a volatile non-solvent for said cellulose ester or ether. Both the compositions employed and their use in the production of effects on cellulose ester and ether materials form important features of the present invention.

By means of the invention it has been found possible to obtain a large variety of different effects, of high quality and good fastness to rubbing, on cellulose ester and ether materials. The effect materials which may be employed may be inorganic or organic in nature, and as examples of suitable effect materials may be mentioned titanium oxide, barium sulphate, zinc oxide, diacetyl or dibenzoyl benzidine, powdered metals, fish scales and insoluble dyestuffs. The effect material is employed in comminuted form and preferably in a very fine state of division, except in cases where the effect to be produced precludes this, as may be the case when, for instance, fish scales form the effect material.

A considerable variety of film-forming substances may be employed. As examples of such substances there may be mentioned cellulose acetate and other water-insoluble esters and ethers of cellulose, e. g. cellulose nitrate, cellulose formate, cellulose propionate, cellulose butyrate, ethyl cellulose or benzyl cellulose and chlorinated rubber and resinous substances such for example as polyvinyl or polyacrylic resins, e. g. a polyvinyl acetate or polymerized styrol. The film-forming substances employed are preferably such as yield, on evaporation of their solutions, colorless, transparent films which do not develop color on exposure to light; compositions containing film-forming substances of this nature give effects of especial brightness, particularly when the effect material is a powdered metal such for example as powdered bronze or powdered aluminium.

When the film-forming substance is a cellulose derivative it is advantageously the same cellulose derivative as is present in the material treated. Nitrocellulose is less desirable than cellulose acetate in that nitrocellulose tends to develop color on exposure to light whereas cellulose acetate does not.

The proportion of film-forming substance employed will vary with its "viscosity characteristics" and the method by which the composition is to be applied. A low viscosity cellulose acetate may form 4, 10, 20% or more of the total weight of the composition. In general a composition designed for application by printing and which contains about 15% of powdered effect material should contain from 7-12%, e. g. 8-9% of an acetone-soluble cellulose acetate of the viscosity commonly employed in lacquers.

The effect compositions of the present invention, as has been indicated, contain a substantial proportion of volatile solvent for the cellulose derivative of the material treated. Where the material contains cellulose acetate, acetone or methyl ethyl ketone is conveniently employed. The proportion of volatile solvent should form not less than about 25%, and may with advantage constitute more than 35%, for example 40–50%, of the total liquid constituents in the effect composition.

In addition to the volatile solvent a volatile diluent exercising little or no solvent action on the cellulose derivative in the material treated is also incorporated in the composition. Examples of diluents suitable for use in compositions for application to materials containing an acetone-soluble cellulose acetate are methyl, ethyl and butyl alcohols, benzene, toluene, xylene, butyl acetate or mixture thereof.

If desired, in addition to the volatile solvent, less volatile solvents may also be incorporated in the composition, particularly such as boil at temperatures of 100 to 200° C., and especially 130 to 170° C. For example, there may be incorporated in the effect composition ethyl lactate, diacetone alcohol or dioxane. Such solvents are preferably employed in proportions of less than 50% of volatile solvent employed, proportions of about 20–30%, e. g. 25%, of the volatile solvent giving very good results. It is, moreover, usually advantageous to employ in the composition a solvent of even lower volatility than those mentioned above and in addition thereto, since not only is the rate of evaporation of the solvent mixture thereby retarded, but the settlement of finely divided pigments and other effect materials is also retarded. Incorporation in the compositions of plasticizers for the film-forming substances therein is also frequently advantageous especially where the material to be treated is a fabric or other product liable to be subjected to flexing and when it is desired to apply the composition to the whole surface of the material, or in bold designs. Where fine designs, e. g. dotted or line designs are desired, the presence of plasticizer in the composition applied is not generally necessary.

Examples of solvents of low volatility and of plasticizers for cellulose esters or ethers which may be employed are benzyl alcohol, dimethyl and diethyl phthalates, triacetin, the aromatic sulphonamides, triphenyl phosphate, tricresyl phosphate, and dibutyl tartrate. Where a solvent of very low volatility or a plasticizer is incorporated in the effect composition it is in general preferable that it should be employed in low proportions. For example, while a composition containing 15 parts by weight of bronze powder dispersed in 85 parts by weight of a solution containing 100 parts of acetone-soluble cellulose acetate, 350 parts of acetone, 150 parts of ethyl lactate 200 parts of xylene and 185 parts of methylated spirits may contain 15 parts of benzyl alcohol and will give very excellent results when printed on a cellulose acetate woven fabric, it is generally inadvisable that the proportion of such a relatively non-volatile solvent in the composition should exceed more than about 25% of the film-forming constituents of the composition.

Any other desired ingredients, e. g. fire retardants or compounds adapted to prevent discoloration of the effects produced on the materials may be incorporated in the effect compositions.

The compositions may be prepared by simple solution or dispersion of the film-forming substance in the liquid medium and dispersion therein of the effect material, e. g. by mixing the liquid medium, film-forming substance, and effect material in a mechanical mixer. Where the effect material is unlikely to be damaged by such a step it is advantageous to knead it with the film-forming substance prior to addition of the main body of the liquid medium. The desirability of employing a composition from which the film-forming substance will deposit as a clear transparent film has already been referred to, and it should be noted that the selection of the liquid constituents of the compositions, and the choice of proportions in which they are to be employed, are important in this connection.

The compositions of the invention may be applied to the materials by any convenient method and the materials then subjected to a drying or steaming or other treatment to fix the effect materials thereon. For example the compositions may be applied locally to the materials by printing, or by brushing, smearing or spraying through stencils. They may also be applied to the whole surface of the material, for example by padding, brushing, spraying or all-over printing. The material may be subjected to any desired treatment before or after the application of the effect composition. For example the material may be dyed or delustred or otherwise treated prior to the application of the effect composition or the treated materials may be subjected to a calendering operation.

The compositions may be applied to materials made of or containing cellulose esters whether those materials are in the form of filaments, yarn, straw or like form, but the invention is of particular importance in connection with the production of effects on such materials in the form of sheets, films, or fabrics; in the treatment of fabrics better results are obtainable in general on materials having a close structure than on materials having an open structure.

The following examples serve to illustrate the invention but it is to be understood that these examples are given solely by way of illustration and are not in any way limitative:—

Example 1

A cellulose acetate solution is prepared from the following ingredients:—

| | Parts by weight |
|---|---|
| Cellulose acetate | 100 |
| Acetone | 350 |
| Ethyl lactate | 150 |
| Xylene | 200 |
| Methylated spirits | 185 |
| Benzyl alcohol | 15 |
| | 1,000 |

A fabric composed of cellulose acetate yarns is dyed a black ground color and is printed with a composition made by incorporating a bronze powder in the cellulose acetate solution in the proportion of 15 parts by weight of bronze powder to 85 parts by weight of the solution. The fabric is dried after printing and a bright metallic print on a black ground is obtained.

Example 2

A cellulose acetate solution is prepared from the following ingredients:—

| | Parts by weight |
|---|---|
| Cellulose acetate | 100 |
| Acetone | 350 |
| Ethyl lactate | 150 |
| Xylene | 200 |
| Methylated spirits | 185 |
| Benzyl alcohol | 15 |
| | 1,000 |

A fabric composed of cellulose acetate yarns is dyed a medium blue ground shade and is printed with a composition made by incorporating an aluminium powder in the cellulose acetate solution in the proportion of 15 parts by weight of aluminium powder to 85 parts by weight of the solution. The fabric is dried after printing and a bright aluminium print on a blue ground is obtained.

Example 3

A polymerized vinyl acetate solution is prepared from the following ingredients:—

| | Parts by weight |
|---|---|
| Polymerized vinyl acetate | 500 |
| Xylene | 350 |
| Acetone | 150 |
| | 1,000 |

A fabric composed of cellulose acetate yarns is dyed a bright green ground shade and is printed with a composition made by incorporating ethyl lactate and a bronze powder in the polymerized vinyl acetate solution in the proportion of 10 parts by weight of ethyl lactate and 30 parts by weight of bronze powder to 80 parts by weight of the solution. The fabric is dried after printing and a bright print on a bright green ground is obtained.

What we claim and desired to secure by Letters Patent is:—

1. Method of producing effects on filaments, yarns, fabrics, straws or the like, consisting substantially of a water-insoluble organic acid ester of cellulose or cellulose ether, which comprises printing thereon a suspension of a comminuted effect material in a solution of a film forming substance in a medium containing 25 to 50% of a volatile solvent for the cellulose derivative of the material treated, and a volatile non-solvent therefor, so as to bond the effect material to said cellulose derivative, said suspension having no solvent action on the cellulose derivative.

2. Method of producing effects on filaments, yarns, fabrics, straws or the like consisting substantially of a water-insoluble organic acid ester of cellulose or cellulose ether, which comprises printing thereon a suspension of a comminuted effect material in a solution of cellulose acetate in a medium containing 25 to 50% of a volatile solvent for the cellulose derivative of the material treated, and a volatile non-solvent therefor, so as to bond the effect material to the cellulose derivative of the material treated, said suspension having no solvent action on the cellulose derivative.

3. Method of producing effects on filaments, yarns, fabrics, straws or the like consisting substantially of a water-insoluble organic acid ester of cellulose or cellulose ether, which comprises printing thereon a suspension of a comminuted effect material in a solution of polymerized vinyl acetate in a medium containing 25 to 50% of a volatile solvent for the cellulose derivative of the material treated, and a volatile non-solvent therefor, so as to bond the effect material to said cellulose derivative, said suspension having no solvent action on the cellulose derivative.

4. Method of producing effects on filaments, yarns, fabrics, straws or the like consisting substantially of cellulose acetate, which comprises printing thereon a suspension of a metal powder material in a solution of cellulose acetate in a medium containing 30–40% of a volatile solvent for the cellulose acetate, a less volatile solvent present in a portion of less than 50% of the volatile solvent, and a volatile non-solvent therefor, so as to bond the effect material to the cellulose acetate of the material treated, said suspension having no solvent action on the cellulose acetate in the material treated.

5. Method of producing effects on filaments, yarns, fabrics, straws or the like consisting substantially of cellulose acetate, which comprises printing thereon a suspension of a metal powder material in a solution of a polymerized vinyl acetate in a medium containing 30–40% of a volatile solvent for the cellulose acetate, a less volatile solvent present in a proportion of less than 50% of the volatile solvent, and a volatile non-solvent therefor, so as to bond the effect material to said cellulose acetate, said suspension having no solvent action on the cellulose acetate.

JOHN ALLAN.
JAMES ARTHUR WAINWRIGHT.

CERTIFICATE OF CORRECTION.

Patent No. 2,101,887.                                     December 14, 1937.

JOHN ALLAN, ET AL.

It is hereby certified that error appears in the printed specification of the above numbered patent requiring correction as follows: Page 3, second column, line 16, claim 4, for the word "portion" read proportion; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

by weight of ethyl lactate and 30 parts by weight of bronze powder to 80 parts by weight of the solution. The fabric is dried after printing and a bright print on a bright green ground is obtained.

What we claim and desired to secure by Letters Patent is:—

1. Method of producing effects on filaments, yarns, fabrics, straws or the like, consisting substantially of a water-insoluble organic acid ester of cellulose or cellulose ether, which comprises printing thereon a suspension of a comminuted effect material in a solution of a film forming substance in a medium containing 25 to 50% of a volatile solvent for the cellulose derivative of the material treated, and a volatile non-solvent therefor, so as to bond the effect material to said cellulose derivative, said suspension having no solvent action on the cellulose derivative.

2. Method of producing effects on filaments, yarns, fabrics, straws or the like consisting substantially of a water-insoluble organic acid ester of cellulose or cellulose ether, which comprises printing thereon a suspension of a comminuted effect material in a solution of cellulose acetate in a medium containing 25 to 50% of a volatile solvent for the cellulose derivative of the material treated, and a volatile non-solvent therefor, so as to bond the effect material to the cellulose derivative of the material treated, said suspension having no solvent action on the cellulose derivative.

3. Method of producing effects on filaments, yarns, fabrics, straws or the like consisting substantially of a water-insoluble organic acid ester of cellulose or cellulose ether, which comprises printing thereon a suspension of a comminuted effect material in a solution of polymerized vinyl acetate in a medium containing 25 to 50% of a volatile solvent for the cellulose derivative of the material treated, and a volatile non-solvent therefor, so as to bond the effect material to said cellulose derivative, said suspension having no solvent action on the cellulose derivative.

4. Method of producing effects on filaments, yarns, fabrics, straws or the like consisting substantially of cellulose acetate, which comprises printing thereon a suspension of a metal powder material in a solution of cellulose acetate in a medium containing 30–40% of a volatile solvent for the cellulose acetate, a less volatile solvent present in a portion of less than 50% of the volatile solvent, and a volatile non-solvent therefor, so as to bond the effect material to the cellulose acetate of the material treated, said suspension having no solvent action on the cellulose acetate in the material treated.

5. Method of producing effects on filaments, yarns, fabrics, straws or the like consisting substantially of cellulose acetate, which comprises printing thereon a suspension of a metal powder material in a solution of a polymerized vinyl acetate in a medium containing 30–40% of a volatile solvent for the cellulose acetate, a less volatile solvent present in a proportion of less than 50% of the volatile solvent, and a volatile non-solvent therefor, so as to bond the effect material to said cellulose acetate, said suspension having no solvent action on the cellulose acetate.

JOHN ALLAN.
JAMES ARTHUR WAINWRIGHT.

CERTIFICATE OF CORRECTION.

Patent No. 2,101,887. December 14, 1937.

JOHN ALLAN, ET AL.

It is hereby certified that error appears in the printed specification of the above numbered patent requiring correction as follows: Page 3, second column, line 16, claim 4, for the word "portion" read proportion; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

CERTIFICATE OF CORRECTION.

Patent No. 2,101,887.   December 14, 1937.

JOHN ALLAN, ET AL.

It is hereby certified that error appears in the printed specification of the above numbered patent requiring correction as follows: Page 3, second column, line 16, claim 4, for the word "portion" read proportion; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)